United States Patent
Deger et al.

(10) Patent No.: US 6,889,734 B2
(45) Date of Patent: May 10, 2005

(54) TIRE CHAIN

(75) Inventors: Werner Deger, Kirchheim (DE); Erhard Weidler, Aalen-Unterkochen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 11 days.

(21) Appl. No.: 10/450,335

(22) PCT Filed: Jan. 28, 2002

(86) PCT No.: PCT/DE02/00352

§ 371 (c)(1), (2), (4) Date: Jun. 11, 2003

(87) PCT Pub. No.: WO02/060706

PCT Pub. Date: Aug. 8, 2002

(65) Prior Publication Data

US 2004/0045648 A1 Mar. 11, 2004

(30) Foreign Application Priority Data

Jan. 30, 2001 (DE) .......................... 101 05 410

(51) Int. Cl.[7] .............................................. B60C 17/00
(52) U.S. Cl. .................... 152/213 A; 152/237; 152/243
(58) Field of Search ................................ 152/231, 217, 152/218, 243, 233, 213 A, 241, 242; 59/25, 35.1, 31, 84, 90; 474/218

(56) References Cited

U.S. PATENT DOCUMENTS

| | | | | |
|---|---|---|---|---|
| 3,785,422 A | * | 1/1974 | Witzel | 152/241 |
| 3,799,232 A | * | 3/1974 | Schnurle | 152/231 |
| 3,974,871 A | * | 8/1976 | Muller et al. | 152/239 |
| 4,020,885 A | * | 5/1977 | Sato | 152/239 |
| 4,063,583 A | * | 12/1977 | Rieger et al. | 152/241 |
| 4,390,053 A | * | 6/1983 | Rieger et al. | 152/213 A |
| 4,860,532 A | * | 8/1989 | Milz | 59/35.1 |
| 6,039,100 A | * | 3/2000 | Muller | 152/243 |

FOREIGN PATENT DOCUMENTS

| | | | |
|---|---|---|---|
| DE | 2651162 | 5/1978 | |
| DE | 19748933 C1 | * 7/1999 | ........... B60C/27/06 |

* cited by examiner

*Primary Examiner*—Frantz F. Jules
(74) *Attorney, Agent, or Firm*—Mark P. Stone

(57) ABSTRACT

A wheel chain has a running lattice structure which is tightened by a pressure cord (8). The pressure cord (8) is connected to a lateral lattice structure arranged on the outer side of the vehicle tires by connecting members (6). Each of the connecting members has a connecting loop (10) for a member of the lateral lattice structure, and a guiding ring (9) for the pressure cord (8). In order to preserve an excess length (7) of the pressure cord (8), the cross-section of the connecting loop (10) is sufficiently large so that the connecting loop (10) provides a pull-through conduit for the excess length (7) of the pressure cord (8).

20 Claims, 3 Drawing Sheets

TIRE CHAIN

FIELD OF THE INVENTION

The invention relates to a tire chain having antislip and/or tire-protecting elements which come to bear in the region of the running tread of a vehicle tire, and having side nets which come to bear in the region of the sidewalls of the vehicle tire, comprise chain links and are connected to a securing strand via connecting elements, the connecting elements each having a connecting eye for an element of the side net and a guide eye, having a sliding cradle, for the securing strand.

PRIOR ART

DE-A 26 51 162 has disclosed a tire-protecting chain having the abovementioned features and connecting elements which have a guiding zone configured in the manner of a sleeve with a convex inner wall, in the case of which connecting elements the cylindrical outer wall of the sleeve is adjoined by a bracket having a bore which can be used as a connecting eye for a chain link and the diameter of which is only slightly greater than the element-wire diameter of the chain link to be connected, which chain link is oriented perpendicularly to the tire sidewall in this case.

In the known design, the length of the sliding cradle of the guide eye is longer than the sum of the pitch t and twice the element-wire diameter d of the securing strand for the running net of the known tire chain.

In particular when securing strands configured as securing chains are used, the known tire chain affords the advantage that the connecting elements can execute movements relative to the securing strand in order to facilitate movements of the side nets to compensate for flattening of the tire in the region of its contact patch.

Moreover, in the context of guiding a tensioning-chain strand, which passes over the running tread of a vehicle tire, for an antislip chain, DE 31 37 311 A1 has disclosed arranging a guide element in the region of the running tread, said guide element being configured in the manner of a sliding sleeve with a sliding cradle, the length of which ensures the tensioning-chain strand passes through unimpeded. Said guide element likewise has a connecting eye which, in contrast to the previously described design, lies in the same plane as the threading eye formed from the sliding sleeve.

Finally, DE 197 48 933 C1 has disclosed a locking element for the tensioning chain of a tire chain, said locking element having a connecting eye for a chain link and a threading opening with a locking slot for securing the position of the tensioning chain.

SUMMARY OF THE INVENTION

The invention is based on the object of firstly permitting unproblematic tensioning of the chain net and secondly facilitating storage of the excess length parts of the tensioning strand, in a tire chain of the generic type under consideration in which the securing strand is configured as a tensioning strand of excess length part. This object is achieved according to the invention in that the connecting eye and the guide eye are arranged in a common plane and in that the dimensions of the connecting eye permit its additional use as a threading eye for an end, which is to be stored, of the securing strand configured as a tensioning strand of excess length part.

In the case of the tire chain according to the invention, in contrast to the known solutions, the connecting element fulfills a dual role, in that it facilitates, as already explained, not only the tensioning of the chain net but also the storage of the tensioning strand.

BRIEF DESCRIPTION OF THE DRAWINGS

Further details and features of the invention are revealed in the subclaims and the following description of a particularly advantageous embodiment of a tire-protecting chain, said embodiment being represented in the attached drawings, in which:

WAYS OF IMPLEMENTING THE INVENTION

Figure 1:
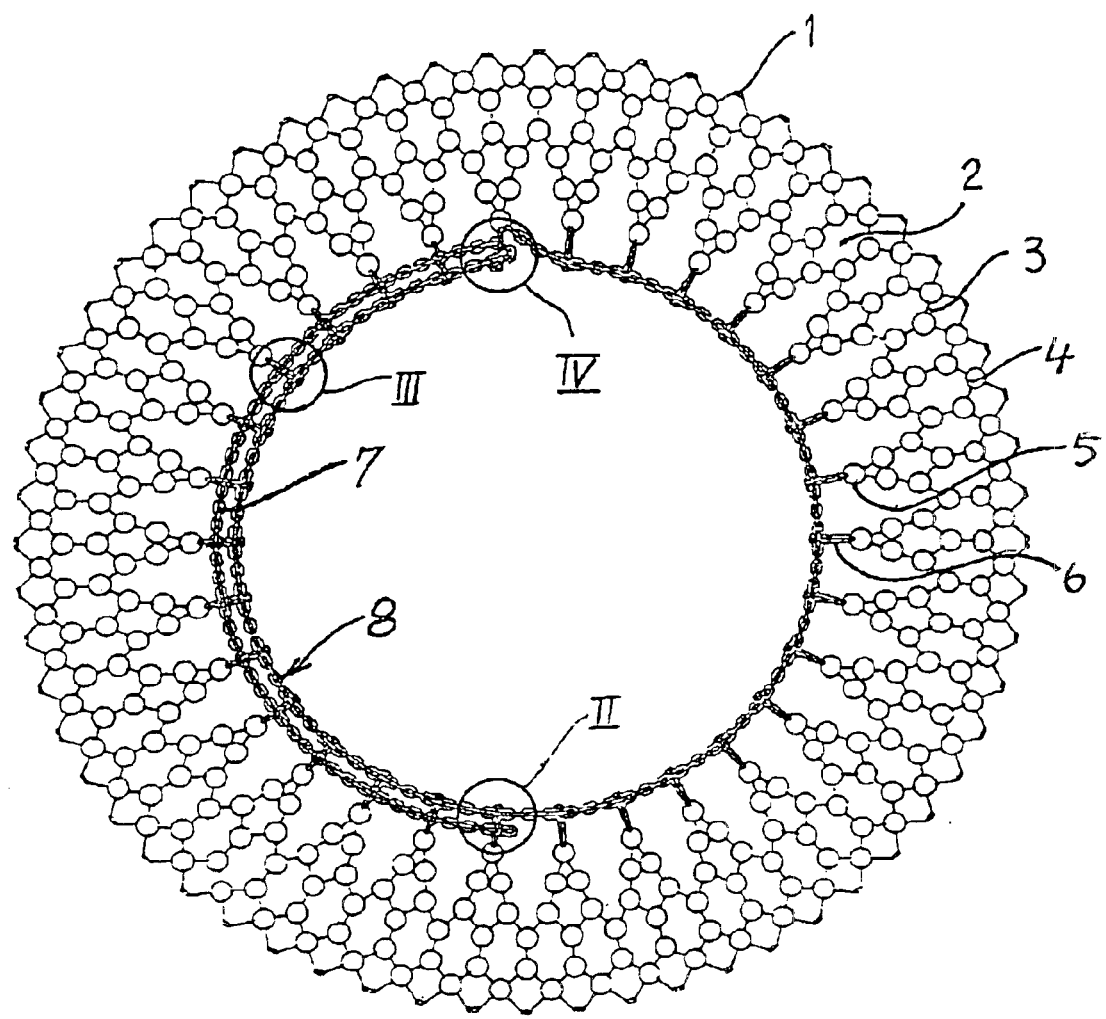
FIG. 1 shows a plan view of the outer side net of a tire-protecting chain having a tensioning strand passing through the threading eyes of the connecting elements and configured as a chain, the end, which is to be stored, of said tensioning strand being threaded into the connecting eyes of the connecting elements.

In the figures, antislip or tire-protecting elements which come to bear on the running tread of a vehicle tire (not shown) are denoted by 1 and are held on the rear side and the front side of the tire by side nets, of which only the front side net 2, which in practise comprises oval vertical elements 3 and circular horizontal elements 4, is represented. Connecting elements 6, serving to guide a tensioning strand 8 having an excess length part 7 and comprising oval chain links, are welded into the end elements 5, formed by horizontal elements, of V-shaped sections of the side net 2.

In order to permit convenient tensioning and unproblematic storage of the excess length part 7 of the tensioning strand 8, the connecting elements 6, configured as die-formed parts, each have a circular guide eye 9 and a pear-shaped connecting eye 10. The dimensions of the connecting eye 10 are chosen to be sufficiently large to permit them to be additionally used as a threading eye.

Figure 2:
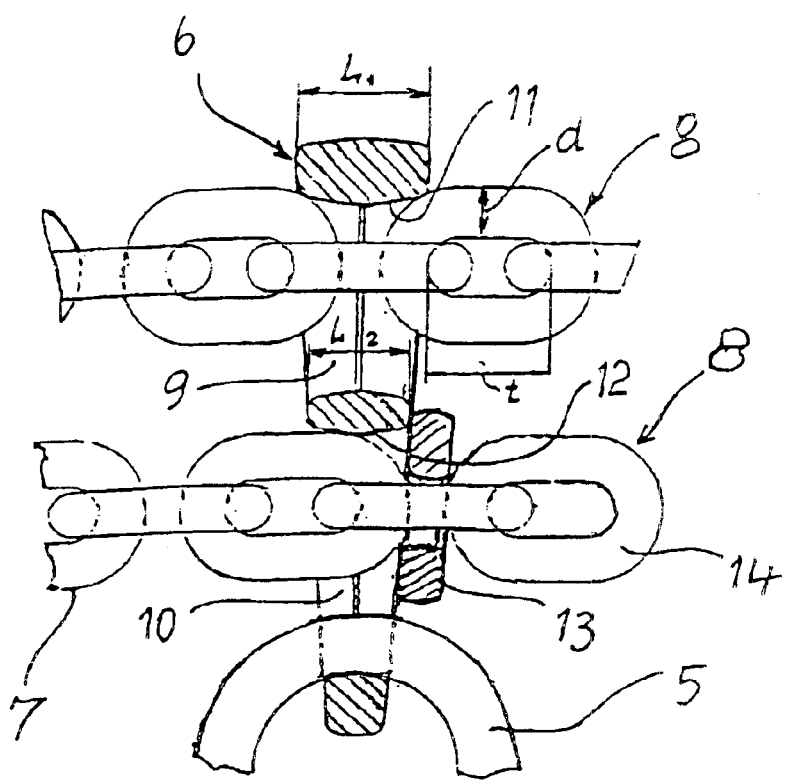
FIG. 2 shows a detail II of FIG. 1 on an enlarged scale.
Figure 3:
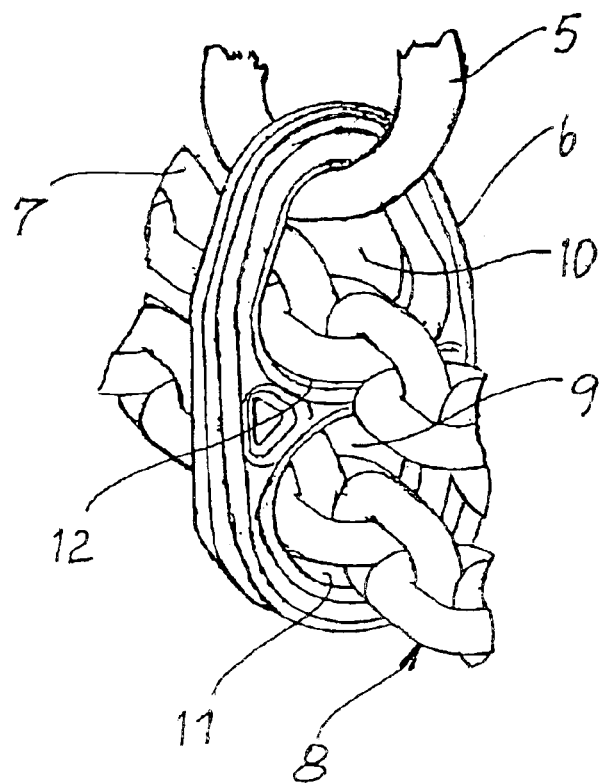
FIG. 3 shows a perspective view, on an enlarged scale, of a connecting element arranged at the location III in FIG. 1.
Figure 4:
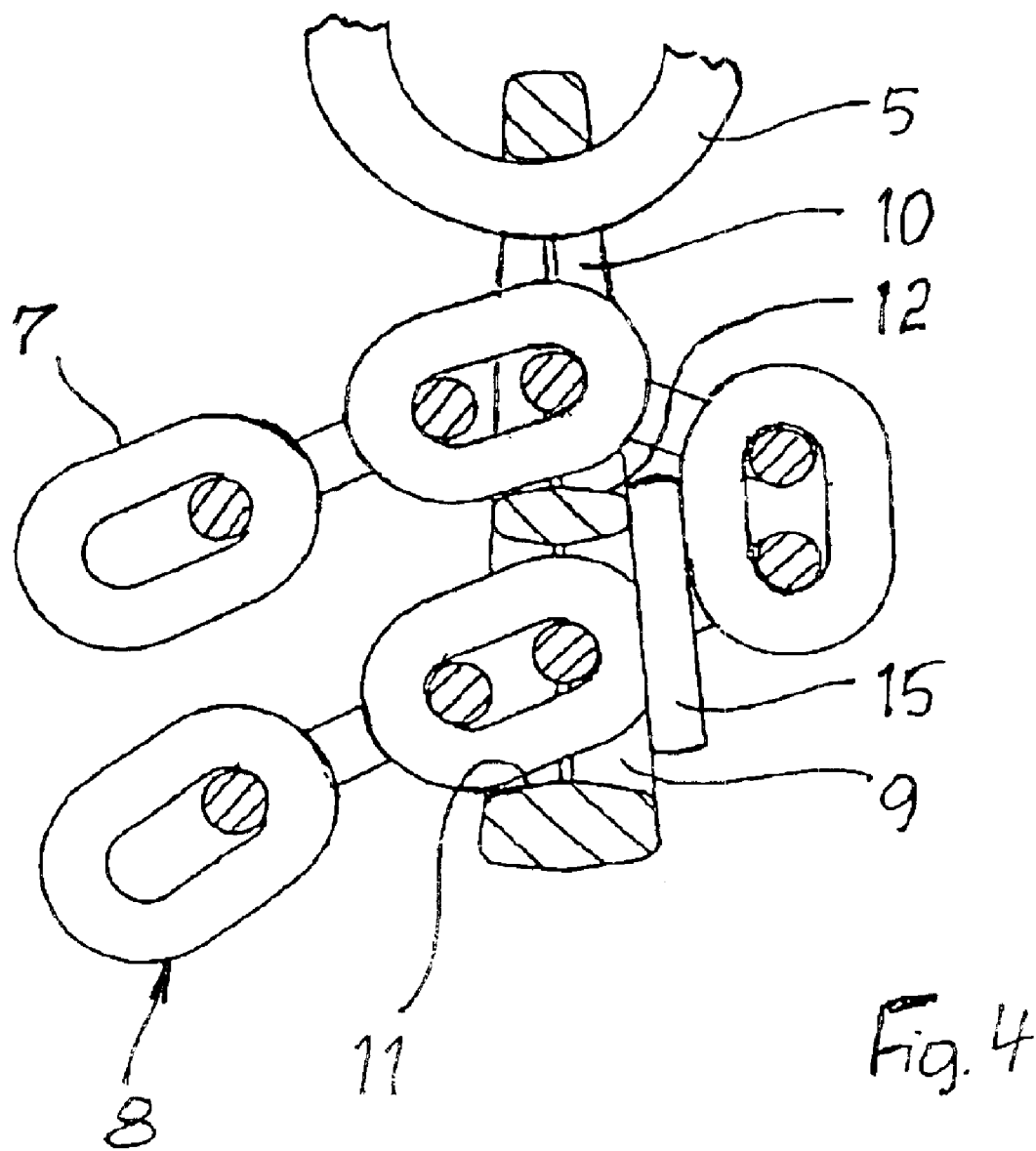
FIG. 4 shows a detail IV of FIG. 1 on an enlarged scale.

As can be seen in FIG. 2, both the guide eye 9 and the connecting eye 10 each have a sliding cradle 11 and 12, respectively, whose supporting lengths $L_1$ and $L_2$, respectively, for the elements of the tensioning strand 8 are each greater than the difference between the pitch t of the elements and the element-wire diameter d of said elements, the supporting length $L_1$ being greater than the supporting length $L_2$. The difference in length between $L_1$ and $L_2$ is justified and appropriate because the forces which are exerted on the sliding cradle 11 by the tensioning strand 8 during the tensioning process and are directed toward the center of the tire are much higher than the forces, the forces acting on the sliding cradle 12 from the tensioning strand 8 while the excess length part 7 is being pulled tight. The different supporting lengths $L_1$ and $L_2$ give rise to the cross-sectional shape, evident from FIG. 2, of the connecting element 6, the slightly convex sliding cradles 11, 12 of which are suitable for configuring the connecting element 6 as a die-formed part. 13 is a locking socket formed from a U-shaped hoop and a crossmember which spans its limb ends, said locking socket locking the end element 14 of the excess length part 7 of the tensioning strand 8 in the tensioned state. A locking socket 15 corresponding to the locking socket 13 is also provided at the location IV in FIG. 1, as can be seen in the detail shown in FIG. 4 on an enlarged scale.

MB:SM:MD

What is claimed is:

1. A tire chain having antislip and/or tire-protecting elements which come to bear in the region of the running tread of a vehicle tire, and having side nets which come to bear in the region of the sidewalls of the vehicle tire, and comprise chain links are connected to a securing strand via connecting elements, the connecting elements each having a connecting eye for an element of the side net and a guide eye, having a sliding cradle, for the securing strand, characterized in that the connecting eye (10) and the guide eye (9) are arranged in a common plane, and in that the dimensions of the connecting eye (10) permits its additional use as a threading eye for an end of the securing strand, said securing strand defining a tensioning strand (8) having an excess length part (7) to be stored.

2. The tire chain as claimed in claim 1, characterized in that the connecting eye (10) is also provided with a sliding cradle (12) for the tensioning strand (8).

3. The tire chain as claimed in claim 2, characterized in that the sliding cradles (11, 12) of the guide eye (9) and of the connecting eye (10) have supporting lengths $L_1$ and $L_2$, respectively, which are greater than the difference between the pitch t of the elements of the tensioning strand (8) and the element-wire diameter (d) of said elements.

4. The tire chain as claimed in claim 3, characterized in that the supporting lengths $L_1$ and $L_2$, respectively, of the sliding cradles (11, 12) are greater than the pitch t of the elements of the tensioning strand (8).

5. The tire chain as claimed in claim 3, characterized in that the supporting length $L_1$ of the sliding cradle (11) of the guide eye (9) is equal to the sum of the pitch t of the elements of the tensioning strand (8) and twice the element-wire diameter d of said elements.

6. The tire chain as claimed in claim 2, characterized in that each sliding cradle (11, 12) has a supporting section which tapers off slightly toward the entry and exit openings of the eyes (9, 10).

7. The tire chain as claimed in claim 2, characterized in that the tensioning strand (8) comprises chain links.

8. The tire chain as claim in claim 7, characterized in that the sliding cradles (11, 12) of the guide eye (9) and of the connecting eye (10) have supporting lengths $L_1$ and $L_2$, respectively, which are greater than the difference between the pitch t of the elements of the tensioning strand (8) and the element-wire diameter (d) of said elements.

9. The tire chain as claimed in claim 8, characterized in that the supporting length $L_1$ of the sliding cradle (11) of the guide eye (9) is equal to the sum of the pitch t of the elements of the tensioning strand (8) and twice the element-wire diameter d of said elements.

10. The tire chain as claimed in claim 8, characterized in that the supporting lengths $L_1$ and $L_2$, respectively, of the sliding cradles (11, 12) are greater than the pitch t of the elements of the tensioning strand (8).

11. The tire chain as claimed in claim 7, characterized in that each sliding cradle (11, 12) has a supporting section which tapers off slightly toward the entry and exit openings of the eyes (9, 10).

12. The tire chain as claimed in claim 2, characterized in that the connecting eye (10) has a substantially pear-shaped passage cross section.

13. The tire chain as claimed in claim 2, characterized in that the guide eye (9) has a circular passage cross section.

14. The tire chain as claimed in claim 2, characterized in that the connecting element (6) has a cross section which increases from the apex, facing the side net (2), of the connecting eye (10) toward the end, facing away from the side net, of the apex of the guide eye (9).

15. The tire chain as claimed in claim 2, characterized in that the connecting element (6) is configured as a forged part.

16. The tire chain as claimed in claim 1, characterized in that the tensioning strand (8) comprises chain links.

17. The tire chain as claimed in claim 1, characterized in that the connecting eye (10) has a substantially pear-shaped passage cross section.

18. The tire chain as claimed in claim 1, characterized in that the guide eye (9) has a circular passage cross section.

19. The tire chain as claimed in claim 1, characterized in that the connecting element (6) has a cross section which increases from the apex, facing the side net (2), of the connecting eye (10) toward the end, facing away from the side net, of the apex of the guide eye (9).

20. The tire chain as claimed in claim 1, characterized in that the connecting organ (6) is configured as a forged part.

* * * * *

UNITED STATES PATENT AND TRADEMARK OFFICE
CERTIFICATE OF CORRECTION

PATENT NO.    : 6,889,734 B2
DATED         : May 10, 2005
INVENTOR(S)   : Werner Deger et al.

It is certified that error appears in the above-identified patent and that said Letters Patent is hereby corrected as shown below:

Column 3,
Line 10, after "chain links", add -- which --.

Signed and Sealed this

Second Day of August, 2005

JON W. DUDAS
*Director of the United States Patent and Trademark Office*